United States Patent Office 2,783,500
Patented Mar. 5, 1957

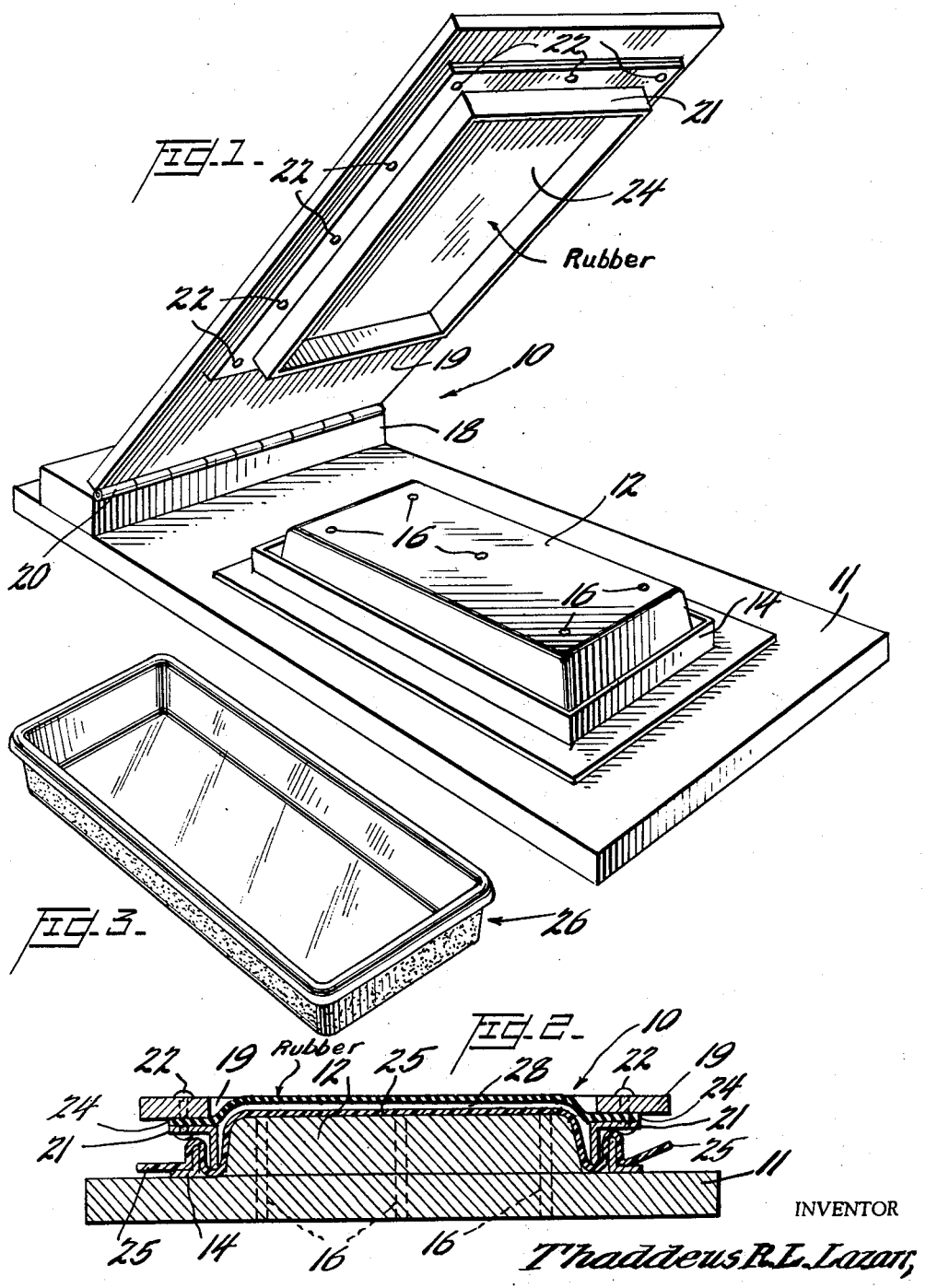

2,783,500
APPARATUS FOR MOLDING MATERIAL

Thaddeus R. L. Lazarr, Greensboro, N. C., assignor to Western Electric Company, Incorporated, New York, N. Y., a corporation of New York Application January 7, 1953, Serial No. 330,033

6 Claims. (Cl. 18—19)

This invention relates to apparatus for molding, and more particularly to apparatus for molding materials wherein a flexible part of a mold captures and pressurizes a gas released by a heated material being molded to assist in the molding of an article.

One of the difficulties in the molding of plastic materials is the problem of fast cooling. This causes the molded material to crack due to localized stresses set up in the material when nonuniform cooling is present. Another problem has been the necessity of an elaborate mold in order to assure a smooth, strong, evenly molded product, particularly for flat surfaces.

An object of the invention is to provide an apparatus for molding materials wherein trapped or captured air is used in the mold to produce a molded surface free of ripples.

Another object of the invention is to provide apparatus for molding material in which the difficulty of too rapid cooling is overcome.

Another object of the invention is to provide apparatus of simplicity for molding materials in which the necessity of an elaborate mold to assure strong and uniform surfaces of the finished product is eliminated.

With these and other objects in view, one embodiment of the invention comprises a mold having interfitting upper and lower die parts for molding materials, for example a thermoplastic material, wherein a sheet of live gum rubber is attached to the upper part so that when a sheet of heated material is positioned on the lower part of the mold and the upper part of the mold is brought into contact with the material to force the material to conform to the shape of the mold, then a hermetic seal is formed between the rubber attachment and the material, and the hot air emanating from the heated sheet of material is captured and exerts pressure against one surface of the material, thereby forcing the other surface of the material against the lower interfitting part of the mold, resulting in a smooth, strong, evenly molded product on all surfaces thereof.

Other objects and advantages will be apparent from the following detailed description when considered in conjunction with the accompanying drawings, wherein:

Fig. 1 is a perspective view of an open mold embodying one form of the invention for molding materials wherein an upper part of the mold is provided with a flexible rubber portion;

Fig. 2 is a transverse cross-sectional view of Fig. 1 with the mold closed and a sheet of heated moldable material being molded therein with trapped air between the material and the flexible rubber portion forming a part of the upper mold; and Fig. 3 is a perspective view of an article of molded material formed by the mold shown in Figs. 1 and 2.

Referring now in detail to the drawings, wherein the same reference characters are employed to designate the same parts throughout the several views, reference numeral 10 designates a mold having a base 11 on which is mounted a lower die 12 of the desired contour which is positioned in the center of a flange 14 that is secured to the base 11 and cooperates with a similar flange 21 on an upper die frame 19. Extending through the lower die 12 and the base 11 are vent holes 16 which are used to expedite the release of a molded article.

A block 18 is secured at one end of the base 11 and the upper die frame 19 is secured to this block by a hinge 20. The flange 21 of the upper die is fastened to the frame 19 by a plurality of rivets 22 passing therethrough. Secured between the frame 19 and the flange 21 is a sheet 24 of live gum rubber which extends over the opening in the frame. Sheet 25 (Fig. 2) designates a sheet of moldable material such as a thermoplastic material like a mixture of a butadiene-acrylonitrile copolymer and an acrylonitrile-styrene copolymer that is molded to form the ultimate product 26.

In the process of molding, a rectangular shaped sheet of heated moldable material, such as a thermoplastic material 25, is positioned over the lower die 12 of the open mold 10 as shown in Fig. 1. The upper part of the mold which comprises the flange 21 and the rubber sheet 24 mounted on the frame 19 is closed over the thermoplastic material 25 as shown in Fig. 2. The flange 21, in cooperation with the flange 14, forces the thermoplastic material 25 against the base 11 and effects a hermetic seal between the flexible rubber sheet 24 and the thermoplastic material 25. The hot air which emanates from the heated sheet 25 of thermoplastic material is captured or trapped to form an air space 28 between the material 25 being molded and the rubber sheet 24 and exerts a uniform pressure against the entire upper surface of the material 25 thereby forcing the lower surface of material 25 against the lower die 12 of the mold. As a result of the compressed air in space 28, the entire surface of the molded material is smooth and even throughout. Since the hot air is retained in the air space 28, the thermoplastic material will not cool rapidly, and therefore the difficulty of too fast cooling is avoided. The vent holes 16 are positioned as shown in Figs. 1 and 2 so that the molded article can be easily removed from the mold after the molding operation, since these vents prevent any low pressure suction condition that may appear between the lower surface of the material 25 and the lower die 12 of the mold. After removal of the molded material 25 from the mold, the excess material is trimmed off to produce the finished article shown in Fig. 3.

It is to be understood that the above-described arrangement is merely illustrative of the principles of the invention and that numerous other modifications may readily be devised by those skilled in the art which fall within the spirit and scope thereof.

What is claimed is:

1. An apparatus for molding plastic material comprising a lower die over which the heated plastic material is positioned, an upper die frame, flexible material secured to the said upper die frame, and a hermetic seal formed by the closure of said upper and lower dies in cooperation with the plastic material being molded, said flexible material on the upper die frame capturing the hot air above the heated plastic material to mold a smooth uniform surface thereon.

2. In an apparatus for molding plastic material, a base, a lower die part secured to the base, an upper die part movably mounted on the base and positioned over said lower part, said upper die part having a molding portion of flexible material, and means on the said upper and lower die parts for engaging the heated plastic material being molded to form a hermetic seal so that the hot air above the plastic material during the molding operation is captured under the said flexible material thereby creating a pressure to force the plastic material against the lower die part.

3. An apparatus for molding hot plastic material comprising a lower die, an upper die hingedly mounted on the lower die to cooperate therewith, said upper die having a molding section of flexible rubber sheet, and means for sealing the dies when closed to capture the hot air above the plastic material during the molding operation between said plastic material and said rubber sheet, said air creating a pressure for forcing the plastic material against the lower die of the mold.

4. A mold for forming plastic materials comprising a base; a rigid die secured to the base and over which a sheet of heated plastic material is placed; a first flange secured to the base and having an upright portion concentric with the rigid die; a movable die frame hingedly mounted to one end of the base; a second flange secured to the movable die frame; and a sheet of live gum rubber secured between said second flange and the movable die frame; said flanges and rubber sheet cooperating with the said sheet of plastic material to form a hermetic seal when the mold is closed so that the hot air above the heated plastic material is captured between said plastic material and said rubber sheet to create a pressure and thereby force the material against the rigid die.

5. An apparatus to mold a sheet of plastic material comprising a mold having a fixed part and a movable part, said fixed part adapted to receive a sheet of heated plastic material thereon, said movable part having a sheet of elastic material secured thereto and adapted to cover the sheet of plastic material, and means to form a hermetic seal between said fixed part and said movable part so that by capturing the heated air above the plastic material molding pressure to form said plastic material is created between said plastic material and said elastic material.

6. An apparatus to mold plastic materials comprising a base, a fixed die part secured to said base and adapted to receive a heated sheet of thermoplastic material thereon, a movable die part hingedly mounted to said base and having fixed thereto a sheet of rubber material, and means to form a hermetic seal between said rubber sheet and said heated plastic sheet to capture the heated air above the plastic sheet to create a molding pressure to shape the plastic material so that no external molding pressure is required.

References Cited in the file of this patent

UNITED STATES PATENTS

| | | |
|---|---|---|
| 1,260,002 | Lanhoffer | Mar. 19, 1918 |
| 1,735,668 | Benge | Nov. 12, 1929 |
| 2,024,092 | Cox | Dec. 10, 1935 |
| 2,045,471 | Kasen | June 23, 1936 |
| 2,282,423 | Kopitke | May 12, 1942 |
| 2,648,099 | Dunmire | Aug. 11, 1953 |